(12) United States Patent
Prihoda (10) Patent No.: US 10,718,544 B2
(45) Date of Patent: Jul. 21, 2020

(54) REINFORCEMENT ASSEMBLY FOR AIR DUCTS

(71) Applicant: PRIHODA s.r.o., Hlinsko (CZ)

(72) Inventor: Zdenek Prihoda, Hlinsko (CZ)

(73) Assignee: PRIHODA s.r.o., Hlinsko (CZ)

( * ) Notice: Subject to any disclaimer, the term of this patent is extended or adjusted under 35 U.S.C. 154(b) by 14 days.

(21) Appl. No.: 16/038,027

(22) Filed: Jul. 17, 2018

(65) Prior Publication Data
US 2019/0024933 A1    Jan. 24, 2019

(30) Foreign Application Priority Data

Jul. 18, 2017    (CZ) .............................. PV 2017-416

(51) Int. Cl.
*F24F 13/02*    (2006.01)
*F16L 11/02*    (2006.01)

(52) U.S. Cl.
CPC ........... *F24F 13/0218* (2013.01); *F16L 11/02* (2013.01); *F24F 13/0254* (2013.01)

(58) Field of Classification Search
CPC ......................................................... F16L 5/00
USPC ......................................................... 138/106
See application file for complete search history.

(56) References Cited

U.S. PATENT DOCUMENTS

| | | | | |
|---|---|---|---|---|
| 2,804,095 A | * | 8/1957 | Schauenburg | E21F 1/04 138/107 |
| 3,527,258 A | * | 9/1970 | Farr | F16L 59/153 138/131 |
| 3,538,956 A | | 11/1970 | Helbing et al. | |
| 3,857,590 A | * | 12/1974 | Meeker | F16L 13/00 285/305 |
| 5,785,091 A | | 7/1998 | Barker | |
| 6,425,417 B1 | | 7/2002 | Paschke | |
| 6,427,727 B1 | * | 8/2002 | Thomas | F16L 11/16 138/106 |
| 6,558,250 B1 | | 5/2003 | Paschke | |
| 6,953,396 B2 | | 10/2005 | Paschke et al. | |
| 8,434,526 B1 | | 5/2013 | Pinkalla et al. | |

(Continued)

FOREIGN PATENT DOCUMENTS

| | | |
|---|---|---|
| CZ | 4882 U1 | 6/1996 |
| CZ | 9895 U1 | 4/2000 |

(Continued)

OTHER PUBLICATIONS

PCT, "International Search Report," issued in connection with PCT Application No. PCT/CZ2018/050040, dated Oct. 29, 2018 (5 Pages).

(Continued)

*Primary Examiner* — Craig M Schneider
*Assistant Examiner* — David R Deal
(74) *Attorney, Agent, or Firm* — AdamsIP, LLC (57) ABSTRACT

A reinforcing assembly for air ducts includes a helical reinforcement with an outer circumference and at least one connecting element for fixing a pitch of a helix formed by the helical reinforcement. The at least one connecting element may be fixed to the helical reinforcement by a plurality of joints with mutually arranged spacing. The reinforcing assembly may be combined with an air duct to form a duct system for transmitting and distributing air that retains its shape regardless of the system's internal air pressure.

28 Claims, 6 Drawing Sheets

(56) References Cited

U.S. PATENT DOCUMENTS

| | | | |
|---|---|---|---|
| 8,844,578 B2 | 9/2014 | Pinkalla et al. | |
| 9,605,864 B2 | 3/2017 | Pinkalla et al. | |
| 9,605,865 B2 | 3/2017 | Pinkalla et al. | |
| 9,612,033 B2 | 4/2017 | Pinkalla et al. | |
| 9,784,469 B2 | 10/2017 | Ramos et al. | |
| 9,927,139 B2 | 3/2018 | Pinkalla et al. | |
| 9,927,140 B2 | 3/2018 | Pinkalla et al. | |
| 2003/0075228 A1* | 4/2003 | Tippett | B32B 1/08 138/125 |
| 2003/0106895 A1* | 6/2003 | Kalal | B65D 21/086 220/9.2 |
| 2005/0184523 A1* | 8/2005 | Stravitz | D06F 58/20 285/409 |
| 2007/0079884 A1* | 4/2007 | Tomerlin | F16L 11/081 138/112 |
| 2007/0209729 A1* | 9/2007 | Tomerlin | F16L 11/10 138/133 |
| 2007/0235100 A1* | 10/2007 | Tomerlin | F16L 11/118 138/112 |
| 2009/0260706 A1* | 10/2009 | Hesse | B64D 13/00 138/144 |
| 2010/0300541 A1* | 12/2010 | Carlay, II | F16K 51/02 137/1 |
| 2011/0253243 A1* | 10/2011 | Tomerlin | F16L 11/042 138/118 |
| 2012/0125472 A1 | 5/2012 | Pinkalla et al. | |
| 2014/0000744 A1 | 1/2014 | Pinkalla et al. | |
| 2014/0007971 A1 | 1/2014 | Pinkalla et al. | |
| 2014/0261835 A1 | 9/2014 | Pinkalla et al. | |
| 2014/0332111 A1 | 11/2014 | Prihoda | |
| 2016/0258650 A1 | 9/2016 | Wang et al. | |
| 2016/0341443 A1 | 11/2016 | Ramos et al. | |
| 2017/0030608 A1 | 2/2017 | Prihoda et al. | |
| 2017/0159965 A1 | 6/2017 | Pinkalla et al. | |
| 2017/0159966 A1 | 6/2017 | Pinkalla et al. | |
| 2017/0314807 A1 | 11/2017 | Prihoda | |
| 2018/0058714 A1 | 3/2018 | Prihoda et al. | |
| 2018/0180319 A1 | 6/2018 | Pinkalla et al. | |

FOREIGN PATENT DOCUMENTS

| | | |
|---|---|---|
| CZ | 13658 U1 | 9/2003 |
| CZ | 13658 U1 | 11/2003 |
| CZ | 17562 U1 | 5/2007 |
| CZ | 22858 U1 | 10/2011 |
| CZ | 23328 U1 | 1/2012 |
| CZ | 23418 U1 | 2/2012 |
| CZ | 303235 B6 | 6/2012 |
| CZ | 304607 B6 | 7/2014 |
| CZ | 27289 U1 | 9/2014 |
| CZ | 304937 B6 | 1/2015 |
| CZ | 28924 U1 | 12/2015 |
| CZ | 305561 B6 | 12/2015 |
| CZ | 306207 B6 | 9/2016 |
| CZ | 307411 B6 | 8/2018 |
| EP | 2426427 A2 | 3/2012 |
| EP | 2439456 A2 | 4/2012 |
| EP | 2573479 A2 | 3/2013 |
| EP | 2578957 B1 | 6/2017 |
| EP | 2535656 B1 | 10/2017 |
| GB | 1343590 A | 1/1974 |
| GB | 1414113 A | 11/1975 |
| GB | 2207481 A | 2/1989 |
| WO | 2012091795 A1 | 7/2012 |
| WO | 2013067172 A2 | 5/2013 |
| WO | 2016187291 A1 | 10/2016 |
| WO | 2016187291 A1 | 11/2016 |
| WO | 2017024301 A1 | 2/2017 |

OTHER PUBLICATIONS

PCT, "Written Opinion," issued in connection with PCT Application No. PCT/CZ2018/050040, dated Oct. 29, 2018 (5 pages).

Prihoda, "Textile Air Diffusers," Technical Data Brochure, Jan. 2010, 66 pages.

Prihoda, "Fabric Ducting & Diffusers," Technical Data Brochure, p. 21, Apr. 2016, 32 pages.

Ducting.com, "Tornado Flex Insulated AD," Specifications Sheet, pp. 1-2, Jan. 2013, 2 pages, available at https://cdn.shopify.com/s/files/1/1592/3963/files/Tornado-Flex_Insulated_AD.pdf?12535554657024098861 (last visited Jul. 18, 2018).

\* cited by examiner

REINFORCEMENT ASSEMBLY FOR AIR DUCTS

CROSS REFERENCES

This application claims the benefit of Czech Patent Application No. PV 2017-416, filed on Jul. 18, 2017, which application is incorporated herein in its entirety by reference.

FIELD OF THE DISCLOSURE

The present disclosure relates generally to a reinforcement assembly for air ducts.

BACKGROUND

Air-conditioning ducts constructed of a woven or nonwoven fabric or foil are commonly used to transport and distribute air. These ducts are commonly referred to as textile diffusers and are typically made from a material sewn to form closed cross-sections of various shapes. The cross-section is usually circular, as described for example, in the Czech Utility Model No. 13658, or forms a part of a circle or a combination of several such components. Ducts of this kind are often designed such that air flowing through and inflating the air duct is distributed into the environment in which the air duct is disposed by passage through perforations within the air duct or through the duct material itself. Generally, the ducts are fastened by means of a mounting system to a fixed part of a building.

A disadvantage of the above-described diffusers and ducts is that their assumed shape is dependent upon the internal air pressure of the duct and, in this respect, are not stable. For instance, when a fan supplying air flow to the duct is switched off, the duct deflates. In some cases, manufacturers try to prevent such duct instability by using various reinforcements. However, reinforcements are not always utilized because they are expensive and often labor intensive as known reinforcements must generally be disassembled and removed before washing the duct and subsequently reassembled and re-inserted into the duct after the duct is washed. Particularly, insertion of each individual reinforcement into a respective pocket within the air duct is time consuming for the user. An example reinforcement assembly for air ducts is provided in WO 2012091795. A great disadvantage of the reinforcement assembly disclosed within WO 2012091795 and other known reinforcements is that they often complicate transport due to their cumbersome design. Although the duct portion of systems utilizing such reinforcement assemblies can be folded into a carton and dispatched at low costs over long distances, the rigid reinforcement assembly itself greatly increase the weight and spatial demands required for transport. An additional reinforcement assembly is disclosed in Czech Patent No. 304607 (US2014332111A1), which discloses a reinforcement assembly generally comprising a set of rings which are interconnected by means of cables. However, the reinforcement assembly disclosed within Czech Patent No. 304607 is also disadvantageous as assembly of the and disassembly of the device is relatively time consuming and may involve significant cable management. Moreover, because the individual rings utilized within the assembly disclosed within Czech Patent No. 304607 have to be sufficiently stiff to assure the function of the assembly, the assembly taught by Czech Patent No. 304607 is relatively expensive and heavy.

SUMMARY

The above-described drawbacks and disadvantages of the prior art are largely eliminated by a reinforcing assembly for air ducts comprising a helical reinforcement having an outer circumference and at least one connecting element for fixing a pitch of a helix formed by the helical reinforcement. The at least one connecting element is fixed to the helical reinforcement by a plurality of joints arranged with mutual spacing. The at least one connecting element may comprise a strip, cord, string, rope or wire. In an embodiment, the reinforcing assembly may further comprise at least one end ring attached or attachable to an end of the helical reinforcement and/or to an end of the at least one connecting element. According to an embodiment, the helical reinforcement may comprise a metal wire or metal strip. The at least one connecting element may comprise a woven or nonwoven fabric. In an embodiment, the helical reinforcement may further comprise a sheath of a woven or nonwoven fabric, and the joints of the plurality of joints formed by sewn connection between the at least one connecting element and the helical reinforcement. The at least one connecting element may extend in parallel to an axis of the helical reinforcement. In one embodiment, the spacing of the joints corresponds to the pitch of the helix of the helical reinforcement in that particular area between the corresponding joints. In some embodiments, the pitch of the helical reinforcement may be 0.4 to 2 times the diameter of the helix of the helical reinforcement.

A duct system may be established by combining the above reinforcing assembly with an air duct. In an embodiment, the reinforcing assembly may be removably inserted into the air duct. In an embodiment, the reinforcing assembly of the system may include at least one end ring that is detachably attached to the inner wall of the air duct.

DESCRIPTION OF THE DRAWINGS

These and other features, aspects, and advantages of the present disclosure will become better understood with regard to the following description, appended claims, and accompanying drawings where:

DETAILED DESCRIPTION

Figure 4A:
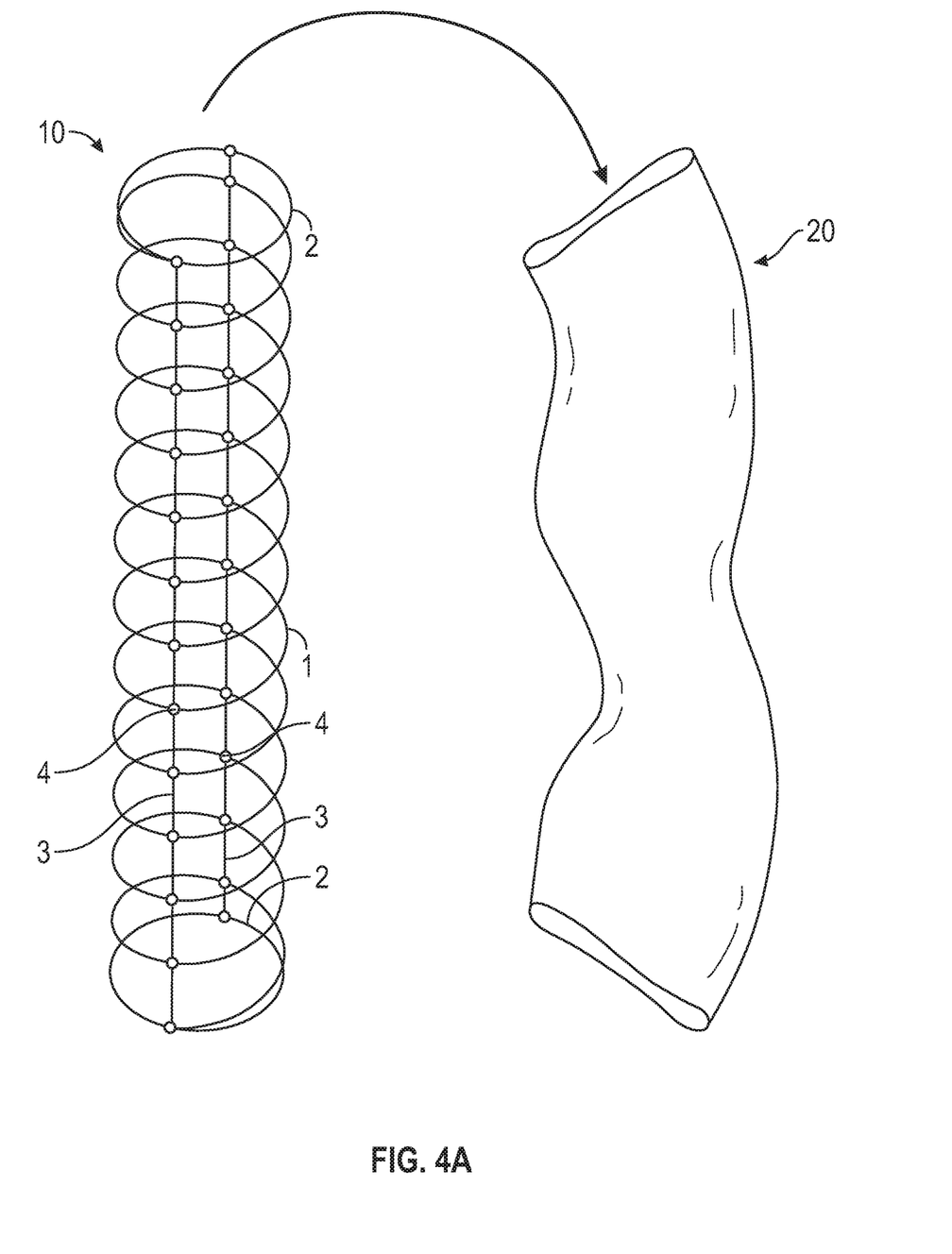
FIG. 4A is a top view of a duct system having features consistent with the principles of the present disclosure.
Figure 4B:
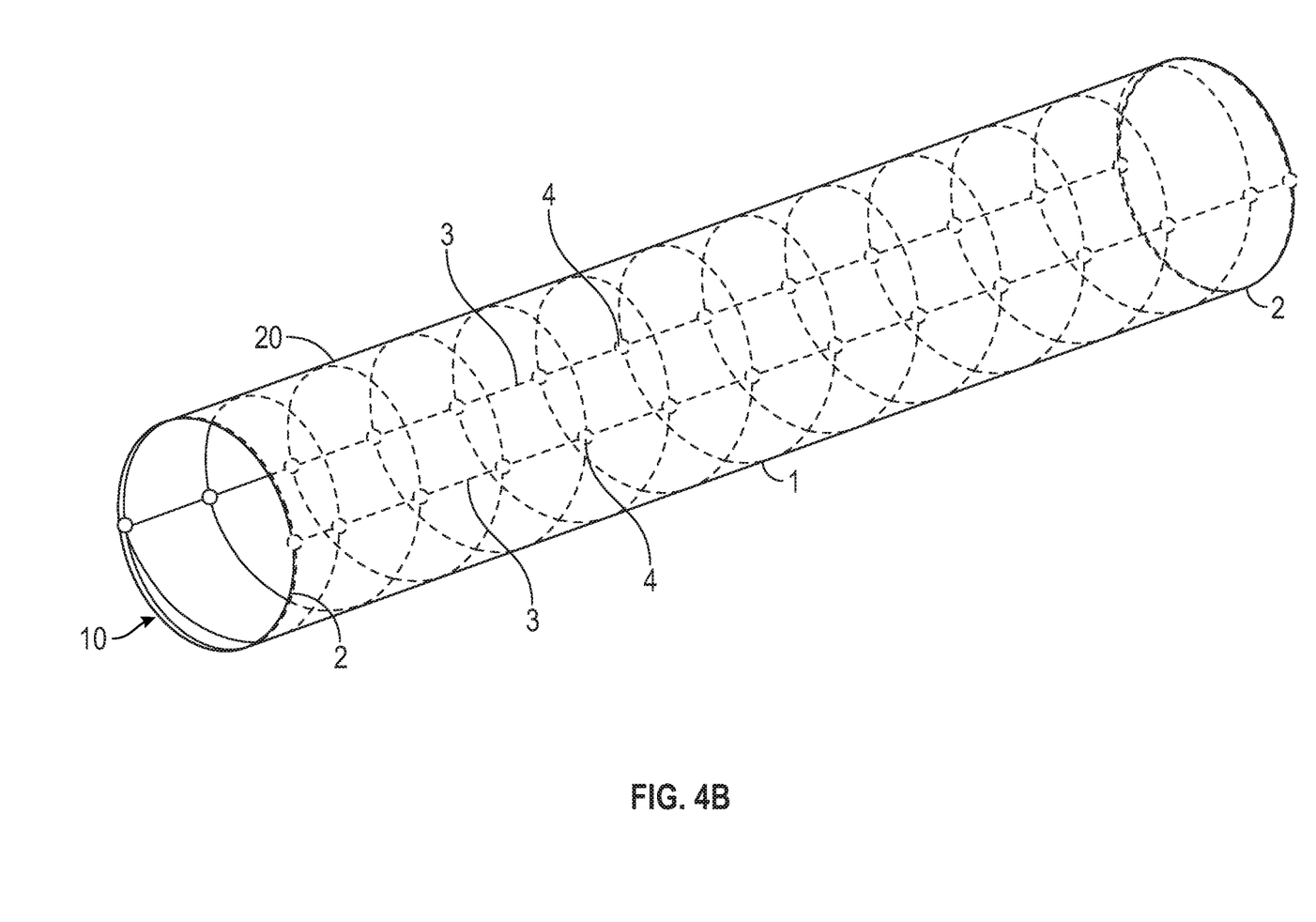
FIG. 4B is a perspective view of duct system having features consistent with the principles of the present disclosure.

In an embodiment, the reinforcing assembly 10 of the present disclosure comprises a pair of end rings 2, between which a helical reinforcement 1 is arranged, and a pair of connecting elements 3 for defining the pitch of the helix formed by the helical reinforcement 1. The helical reinforcement 1 has an outer circumference which, upon insertion into an air conditioning duct 20, delimits the duct's cylindrical inner circumference, i.e. the reinforcement holds the walls of the air-conditioning duct 20 so as to extend substantially along a cylindrical surface, as best shown in FIG. 4B. Accordingly, the helical reinforcement 1 preferably has a radius substantially corresponding to the radius of the respective air duct 20.

Figure 1A:
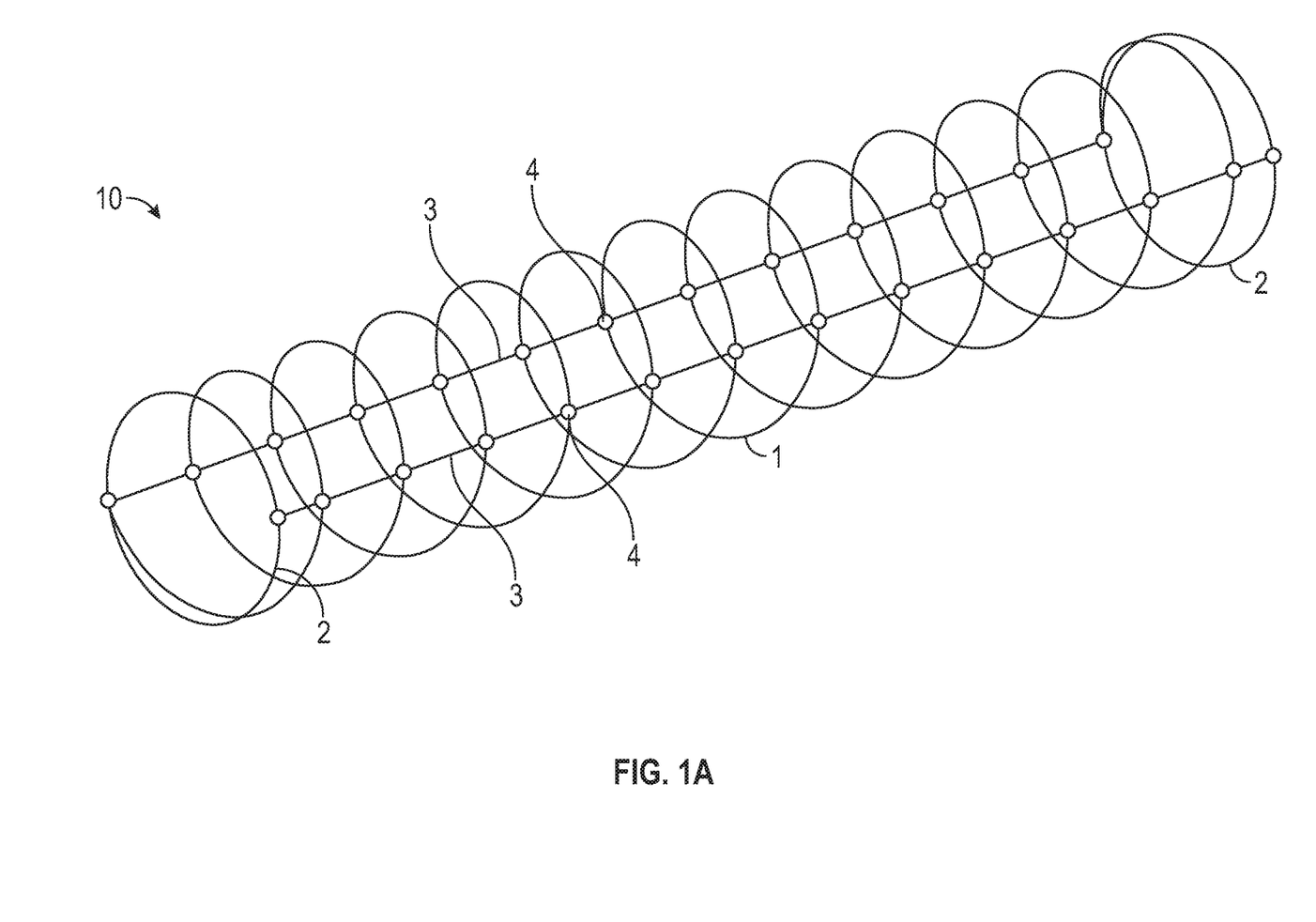
FIG. 1A is a perspective view of a reinforcing assembly having features consistent with the principles of the present disclosure.
Figure 1B:
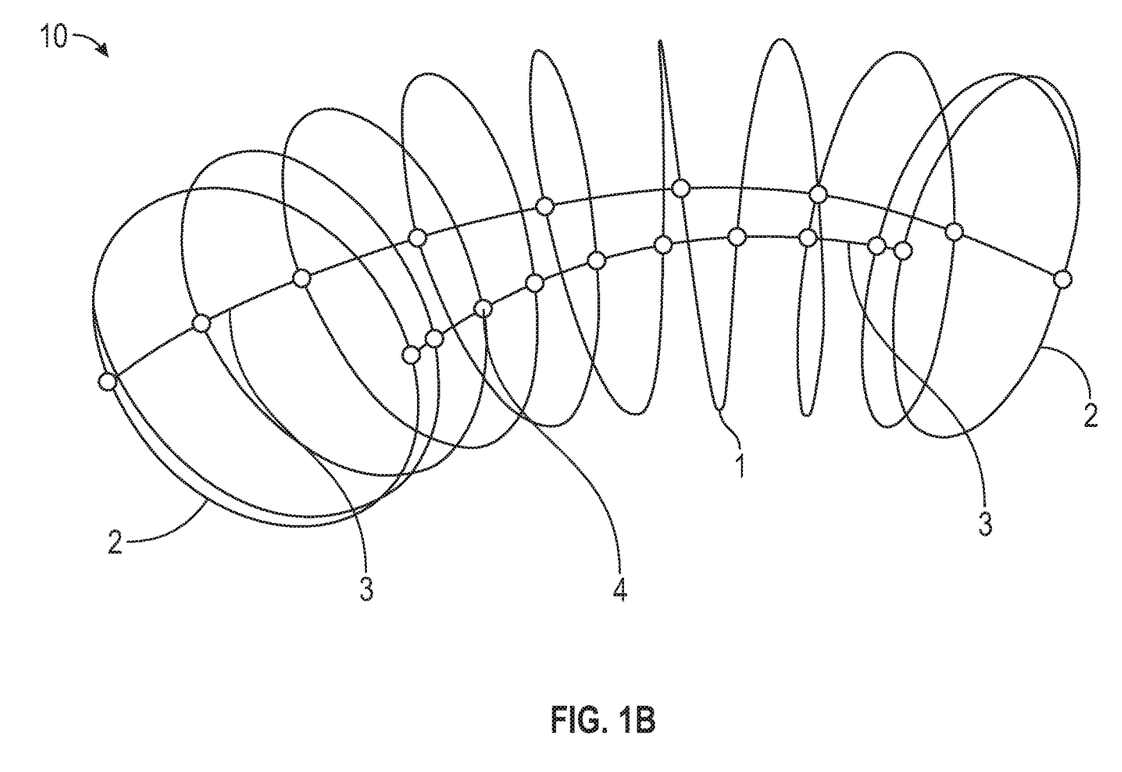
FIG. 1B is a perspective view of a reinforcing assembly having features consistent with the principles of the present disclosure retaining a longitudinally arced configuration.

A "helix" as used herein refers to a curve that corresponds to the movement of a point that moves evenly along an axis and at the same time it evenly circulates around the axis with a constant distance from the axis. A section corresponding to one circle around the axis (360°) is called a thread, and the distance of its end points is called the height of the thread or "pitch" of the helix. A pair of connecting elements 3 is fixed to the helical reinforcement 1 by a set of spaced apart joints 4, which corresponds to the pitch of the helix in the area. It will be appreciated that the helical reinforcement 1, when the connecting elements 3 have been attached, may, but does not need to, have constant pitch along its entire length. As shown in FIG. 1B, the helical reinforcement 1 may be placed in a fixed configuration by means of connecting elements 3 such that a longitudinal axis defined by the helical reinforcement 1 passes along an arc. In such embodiments, the reinforcing assembly 10 may be used in air ducts 20 that are arranged to form an arc.

The helical reinforcement 1 is may be constructed of a galvanized metal wire or strip. In some embodiments, the helical reinforcement 1 may be constructed of a metal wire having a diameter of 1.5 mm to 3 mm. In one embodiment, a metal wire defining the helical reinforcement 1 has a diameter of 2 mm. It is also possible to make the helical reinforcement of a plastic or composite material strip or cable, or of a metal coated with plastic.

The helical reinforcement 1 may comprise not only the metal wire or strip itself, but also a textile sheath, which surrounds or covers the metal wire or strip. In the event the wire or strip of the helical reinforcement 1 corrodes, the sheath may serve to hide such corrosion from visibility and prevent such corrosion from staining a textile duct 20 in which the reinforcing assembly 10 is disposed. In addition to the foregoing, the use of a sheath may facilitate easier securement of the at least one connecting element 3 to the helical reinforcement 1, e.g., by way of a sewn connection. The sheath may comprise a textile tube in which the metal wire or strip of the helical reinforcement 1 may be removably disposed.

The end rings 2 may comprise reinforcing members forming a cross (not shown), or reinforcing spokes, etc. It will be appreciated that other forms of a reinforcing member may be used, or the reinforcing member may be omitted altogether, if the end ring 2 is sufficiently rigid due to the material and/or cross-section of the ring. The end rings 2 are may be formed by a metal ring made of a rod profile having a diameter of 2 mm to 6 mm. In one embodiment, the end rings 2 are formed by a metal ring of a rod profile having a diameter of 3 mm to 5 mm. In another embodiment the end rings 2 are formed by a metal ring of a rod profile having a diameter of 4 mm. In an embodiment, the end rings 2 may be construed from aluminum.

Attachment of the connecting elements 3 to the helical reinforcement 1 can, for example, be provided by sewing the connecting element 3 to the sheath of the helical reinforcement 1 or by means of an eye/loop/through hole, optionally with a hook and loop fastener on the connecting element 3 and/or on the sheath of the helical reinforcement 1 and/or on a loop, which may be opened. In one embodiment, the connecting elements 3 are provided with through holes arranged with predetermined mutual spacing such that the helical reinforcement 1 may be guided through the through holes.

Figure 2A:
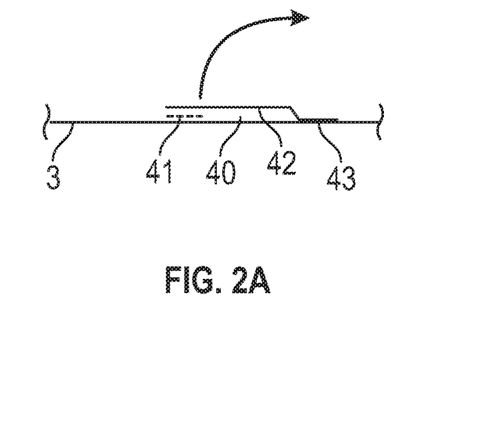
FIG. 2A is a side view of a connecting element and joint having features consistent with the principles of the present disclosure.
Figure 2B:
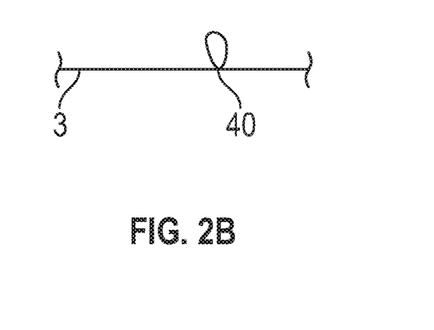
FIG. 2B is a side view of a connecting element and joint having features consistent with the principles of the present disclosure.

FIGS. 2A and 2B illustrate examples of connecting elements for connecting the helical reinforcement 1 and the connecting elements 3. As shown in FIG. 2A, which shows a part of the connecting element 3, a retaining strap 42 may be secured to the connecting element 3, for example, by stitching 43, wherein the retaining strap 42 may be lifted off in the direction shown by the arrow or tilted down and fastened in that position by a coupling element 41, such as a hook and loop fastener. By fastening the retaining strap 42 in the foregoing manner, a loop 40 can be formed through which the helical reinforcement 1 may pass. A hook and loop fastener may extend along the entire length of the retaining strip 42 and/or along the opposite portion of the connecting element 3, which may improve stability of the set position of the connecting element 3 with respect to the helical reinforcement 1. Referring to FIG. 2B, the connecting element 3 may comprise a cord comprising loops/eyes 40 for the passage of the helical reinforcement 1.

Figure 3A:
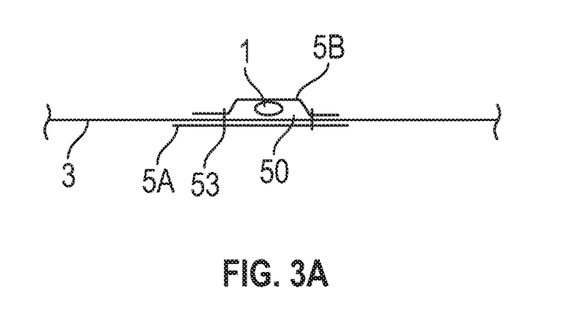
FIG. 3A is a cross-sectional view of a section of a reinforcing assembly having features consistent with the principles of the present disclosure.
Figure 3B:
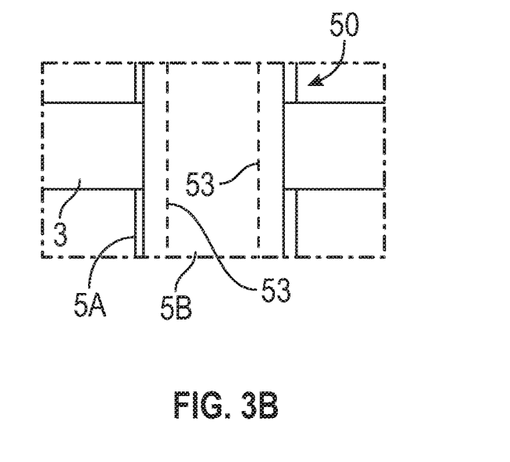
FIG. 3B is a top plan view of the section shown in FIG. 3A.

As shown in FIGS. 3A and 3B, a joint 4 may be defined by the sheath of the helical reinforcement 1. In such embodiments, the sheath of the helical reinforcement 1 is formed from a first strip 5A and a second strip 5B which extend parallel to each other and are sewn together by a pair of stitching 53 which extend along the side edges of the strips 5A and 5B, wherein a cavity 50 is formed between the strips 5A, 5B, and the helical reinforcement 1 is arranged within the cavity 50. The connecting element 3 passes through the cavity 50 and its position with respect to the strips 5A, 5B is defined by the stitching 53. Instead of passing through the cavity 50, the connecting element 3 may be attached to the sheath adjacent to the outer side of one of the strips 5A, 5B. The sheath may also be made from a single folded strip, which has been sewn together to form a sleeve.

The number of connecting elements 3 may depend on the diameter of the duct 20 in which the reinforcing assembly 10 is to be installed. In some instances, one connecting element 3 may be sufficient to adjust the pitch of the helical reinforcement 1. In one embodiment, the reinforcing assembly 10 may comprise at least two connecting elements 3. In another embodiment, the reinforcing assembly 10 may comprise at least three connecting elements 3. The connecting elements 3 may extend in parallel to the axis of the helical reinforcement 1. The connecting elements 3 within the reinforcing assembly 10 may be arranged with a uniform mutual angular spacing.

The connecting elements 3 may be constructed of a flexible material, preferably of a fabric. The material is preferably non-elastic. However, in another preferred embodiment, it may be advantageous to provide a better adaptability of the length and/or arcuate passage of the reinforcing assembly 10 relative to the respective air duct 20 when at least part of at least one, or each of the connecting elements 3 is of an elastic material.

According to an embodiment, both the ends of the connecting elements 3 and the ends of the helical reinforcement 1 are fastened to end rings 2. It is also possible to fasten the end rings 2 to the duct 20 itself and/or to fasten the ends of the helical reinforcement 1 to the duct, for example, by inserting the same into pockets provided in the duct at its end and/or by fastening the same by means of a hook and loop fastener or other, preferably dismountable, connection to the duct 20 wall.

Figure 5:
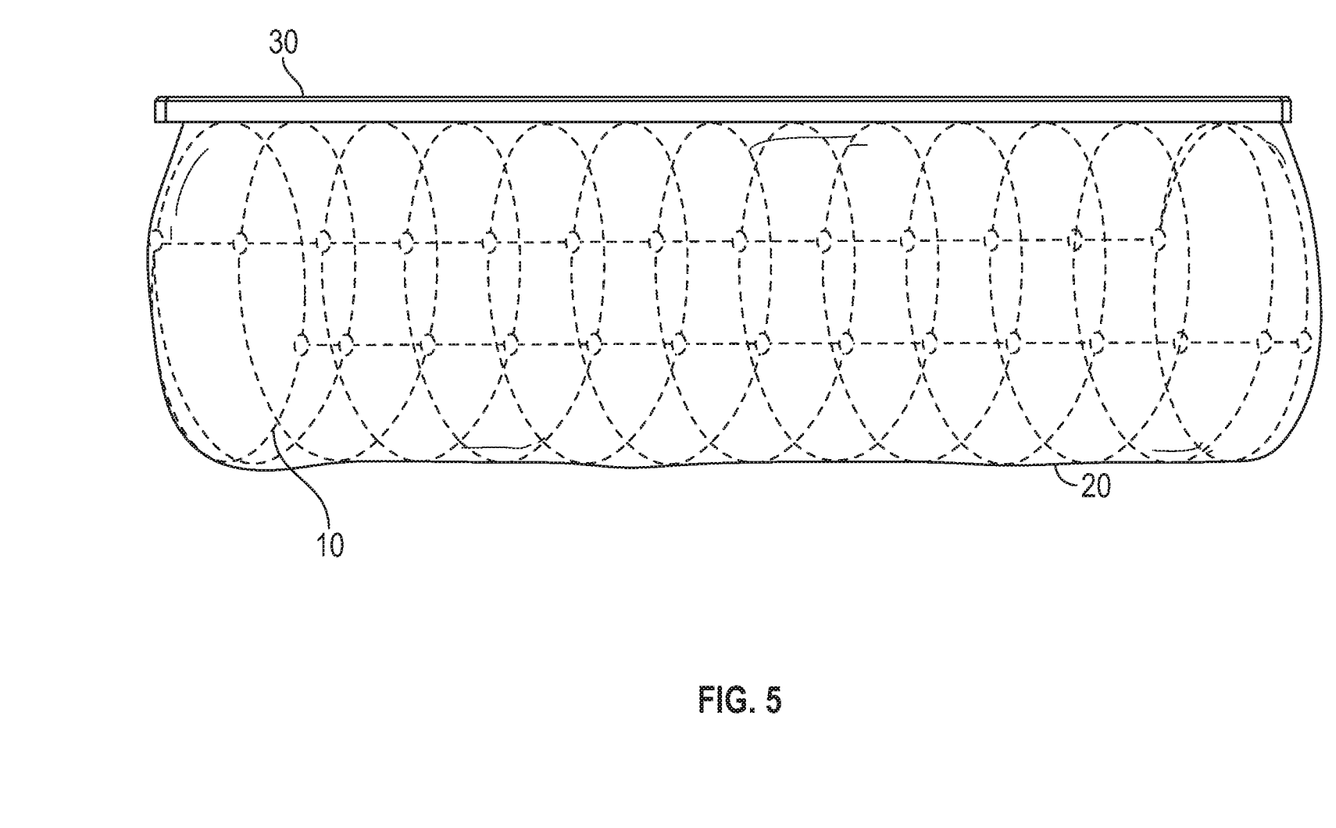
FIG. 5 is a side view of a duct system having features consistent with the principles of the present disclosure.

As shown in FIG. 5, the duct 20 itself may be hung on a support structure 30, such as a rail (carrier profile) or cable by means of a set of hooks or strips which are hung on the cable or inserted into a carrier profile. In some instances, the end rings 2 may be fastened to the rail. To secure the position of the end rings 2 in a plane perpendicular to the longitudinal axis of the rail, the end rings 2 may be supported by an auxiliary supporting element which prevents tilting of the end ring 2 with respect to the rail. For example, one end of the auxiliary support element may be attached to the center crossing of the spokes (not shown) of the end rings 2 and the other end is detachably attached to the rail spaced apart from the point of attachment of the respective ring 2 to the rail. Alternatively, the support element may be fastened to the ring 2 in the region more or even most distant from the point of attachment of the ring 2 to the rail. According to another embodiment, the support element can be provided in the form of an L-piece, one side of which is fixed to the ring 2 and extends in its plane and the other side is fastened to the rail and extends parallel to the longitudinal axis of the rail. According to yet another embodiment, it is possible to use a tensioning auxiliary supporting element which connects the end ring 2 with a fixed building element arranged outside the duct.

According to another preferred embodiment, any or each of end rings 2 may be arranged inside the duct 20 in a removable pocket which extends along the inner circular circumference of the duct 20. The removable pocket is formed by a strap sewn to the inner wall of the duct 20 so as to be able to be tilted from the duct 20 wall for insertion of the end ring 2 and then it may be tilted back towards the duct wall 20 so that the end ring 2 is housed in the annular cavity thus formed. In addition, the strap is preferably attachable in the position adjacent the wall by means of a fastener, for example by means of a hook and loop fastener.

The air duct 20 may be attached to a source of conditioned air, such as a supply duct or a part thereof, and on the other side it is preferably tensioned in the longitudinal direction. The longitudinal tension of the duct 20 can be provided, for example, by means of a tensioning element, which is fixed to the radial end wall of the duct 20 at one side and to a rail or to a rigid building element outside the duct on the other. Alternatively, the longitudinal tension can be provided by means of a loop on the upper side of the end radial wall or of the side wall of the duct 20, the loop being fixed relative to the rail.

The end rings 2 and the helical reinforcement 1, enable the air duct 20 to maintain its shape even during the periods when the fan (or other source of conditioned air) is switched off, or when there is lowered pressure in the duct. In such a situation, the outer circumference of the helical reinforcement 1 contributes to maintaining the shape of the duct between the end rings 2.

However, the use of the end rings 2 is optional. For example, at the inlet end of the air conduit, the end ring may be replaced by a structural member belonging to the inlet duct or device and at the other end, for example, the helical reinforcement 1 can be secured by means of the connecting elements 3 or by means of a separate connecting element. In some instances, the helical reinforcement 1 may be secured directly to the duct so that its last thread has substantially zero pitch. In other words, in some embodiments, an end ring 2 may be formed directly from the helical reinforcement 1.

Functionality of the reinforcing assembly 10 is maintained without the necessity of any adjustments, even when it is necessary to extend the air duct to form an arc, that is, when the rail, on which the air duct 20 is suspended, is arced. During installation, the reinforcing assembly 10 is assembled and is subsequently inserted into the air duct 20 at one end thereof, as best shown in FIGS. 4A and 4B. A first end ring 2 may be at least temporarily fixed to the duct 20 so that a second end ring 2, opposite the first end ring 1, and/or the end of the helical reinforcement 1 may be pulled to stretch the helical reinforcement 1 and connecting elements 3 within the duct 20. Once the helical reinforcement 1 and connecting elements 3 are stretched, the second end ring 2 may be at least temporarily fixed to the duct 20 or to an external tensioning system (not shown).

The Reinforcing assembly 10 according to the present disclosure may be used for air conditioning ducts 20 made from woven or nonwoven fabrics or foils, which are industrially usable in air conditioning installations, especially in plants with higher demands on hygiene and cleanliness.

What is claimed is:

1. A reinforcing assembly for an air duct, the assembly comprising:
    a helical reinforcement with an outer circumference, wherein the helical reinforcement comprises a sheath comprising at least one of a woven fabric and a nonwoven fabric; and
    at least one connecting element for fixing a pitch of a helix formed by the helical reinforcement,
       the at least one connecting element being fixed to the helical reinforcement by a plurality of joints arranged with mutual spacing.

2. The assembly of claim 1, wherein the at least one connecting element comprises at least one of a strip, a cord, a string, a rope, and a wire.

3. The assembly of claim 1, further comprising at least one end ring configured to attach to at least one of an end of the helical reinforcement and an end of the at least one connecting element.

4. The assembly of claim 1, wherein the helical reinforcement comprises a metal member.

5. The assembly of claim 1, wherein the at least one connecting element comprises at least one of a woven fabric and a nonwoven fabric.

6. The assembly of claim 1, wherein each joint of the plurality of joints is defined by a sewn connection between the at least one connecting element and the sheath.

7. The assembly of claim 1, wherein the at least one connecting element extends in parallel to an axis extending longitudinally through the helical reinforcement.

8. The assembly of claim 1, wherein the spacing of joints within the plurality of joints corresponds to the pitch.

9. The assembly of claim 1, wherein the pitch is 0.4 to 2 times the diameter of the helix.

10. A reinforcing assembly for an air duct, the assembly comprising:
    a helical reinforcement with an outer circumference, wherein the helical reinforcement is defined by a metal member surrounded by a textile sheath;
    at least one connecting element for fixing a pitch of a helix formed by the helical reinforcement,
       each connecting element of the at least one connecting element being fixed to the helical reinforcement by a plurality of joints, wherein the spacing between adjacent joints within the plurality of joints corresponds to the pitch; and at least one end ring disposed at an end of at least one of the helical reinforcement and an end of the at least one connecting element.

11. The assembly of claim 10, wherein each connecting element of the at least one connecting element extends in parallel to an axis extending through the helical reinforcement.

12. The assembly of claim 11, wherein the helical reinforcement arcs longitudinally as the helical reinforcement extends from a first end to a second end.

13. The assembly of claim 10, wherein the at least one connecting element comprises at least one of a woven fabric and a nonwoven fabric.

14. The assembly of claim 13, wherein each joint within the plurality of joints is defined by a sewn connection between the at least one connecting element and the helical reinforcement.

15. The assembly of claim 13, wherein each joint within the plurality of joints is defined by a cavity formed within the sheath.

16. The assembly of claim 15, wherein the helical reinforcement extends through the cavity in a first direction and the at least one connecting element extends through the cavity in a second direction substantially perpendicular to the first direction.

17. The assembly of claim 10, wherein the plurality of joints is defined by at least one of one or more retaining straps secured to the at least one connecting element, one or more eyelets of the at least one connecting element, and one or more through holes extending through the at least one connecting element.

18. The assembly of claim 10, wherein the pitch is 0.4 to 2 times the diameter of the helix.

19. The assembly of claim 10, wherein the pitch varies as the helical reinforcement extends from a first end to a second end.

20. The assembly of claim 10, wherein the at least one end ring is formed by the helical reinforcement.

21. The assembly of claim 10, wherein the at least one end ring comprises a first end ring and a second end ring, the first end ring being secured to a first end of the helical reinforcement and a first end of the at least one connecting element and the second ring being secured to a second end of the helical reinforcement and a second end of the at least one connecting element.

22. The system of claim 21, further comprising a support structure from which the duct is suspended.

23. A duct system comprising:
an air duct; and
a reinforcement assembly removably inserted within the air duct, the reinforcement assembly comprising:
   a helical reinforcement with an outer circumference for defining an internal cylindrical circumference of the air duct, wherein the helical reinforcement is defined by a metal member surrounded by a textile sheath; and
   at least one connecting element for fixing a pitch of a helix formed by the helical reinforcement,
      the at least one connecting element being fixed to the helical reinforcement by a plurality of joints arranged with mutual spacing.

24. The system of claim 23, wherein the at least one connecting element comprises at least one of a strip, a cord, a string, a rope, and a wire.

25. The system of claim 23, wherein the reinforcing assembly further comprises at least one end ring disposed at an end of at least one of the helical reinforcement and the at least one connecting element.

26. The system of claim 23, wherein each joint within the plurality of joints is defined by a sewn connection between the at least one connecting element and the helical reinforcement.

27. The system of claim 23, wherein the at least one connecting element extends in parallel to an axis extending through the helical reinforcement.

28. The system of claim 23, wherein the spacing between adjacent joints within the plurality of joints corresponds to the pitch.

* * * * *